Oct. 21, 1969  D. L. HICKS  3,473,407

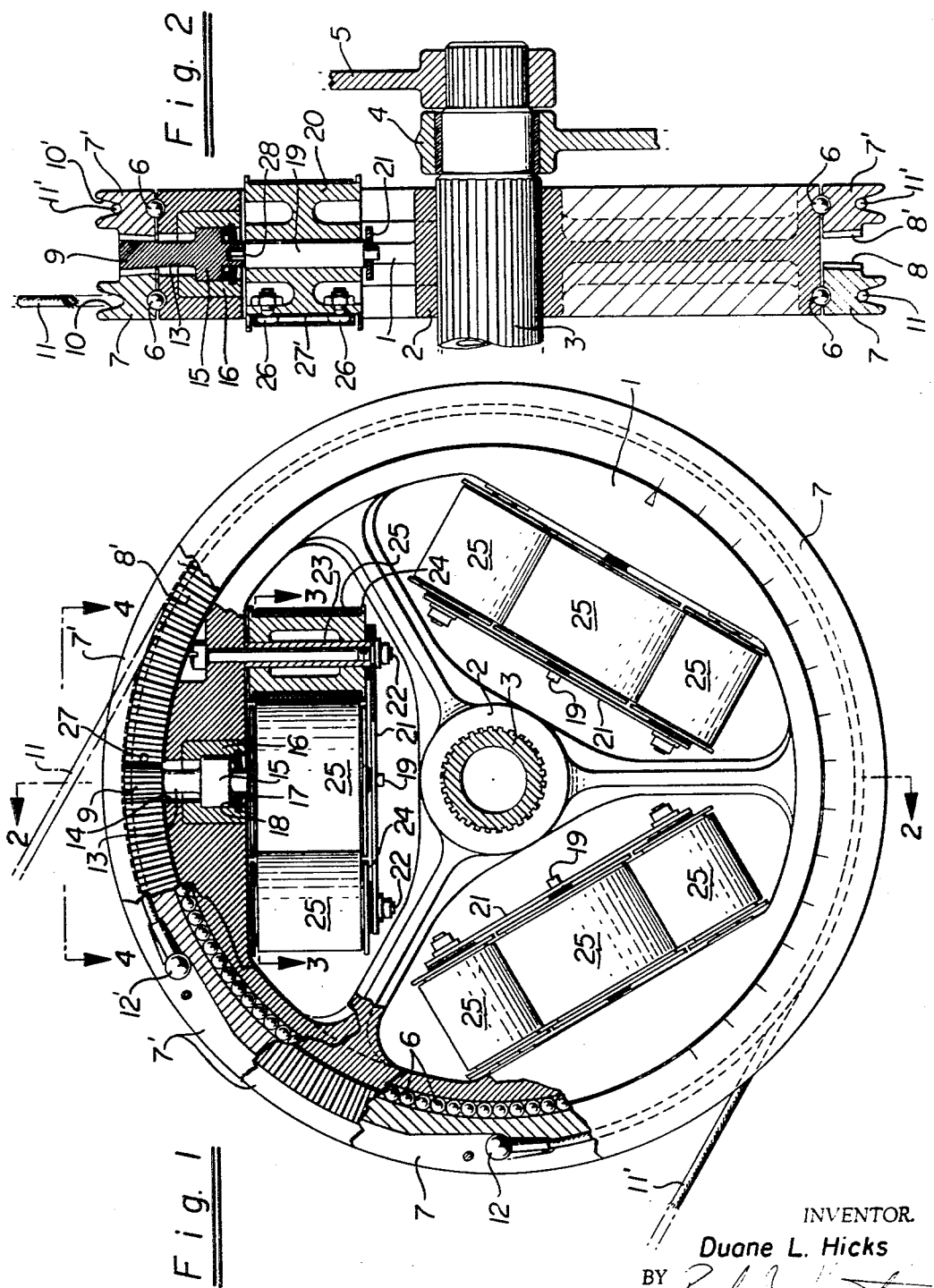

CABLE TENSION REGULATOR

Filed Oct. 12, 1966  4 Sheets-Sheet 2

INVENTOR.
Duane L. Hicks
BY *Paul B. Hunter*
Attorney

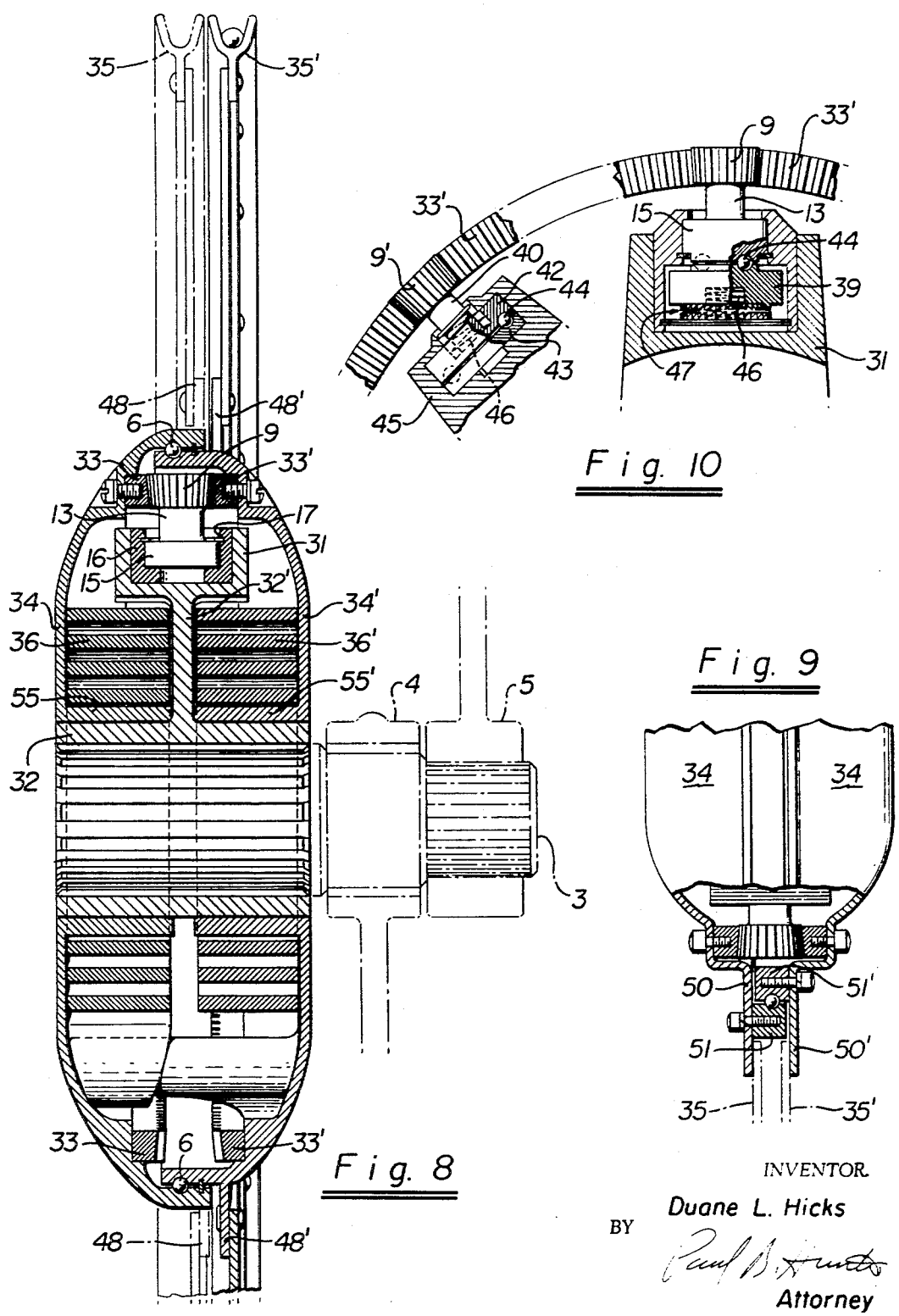

United States Patent Office 3,473,407
Patented Oct. 21, 1969

3,473,407
CABLE TENSION REGULATOR
Duane L. Hicks, Orange, Calif., assignor to Pacific Scientific Company, City of Commerce, Calif., a corporation of California
Filed Oct. 12, 1966, Ser. No. 589,481
Int. Cl. F16c 1/10
U.S. Cl. 74—501.5                               8 Claims This invention relates generally to cable tension regulators, and the invention has reference, more particularly, to a novel regulator that is capable of providing for large amounts of compensation in use.

Conventional cable tension regulators are seriously limited in the amount of cable compensation they can provide, i.e., correction for changes in length of control cables due to aircraft structure flexure, temperature changes, etc., and this is particularly true when using the smaller diameters of regulators. These regulators as heretofore constructed generally employ spring pressed rectilinearly movable "crossheads" or rotatable screw designs connected to the cables or cable sheaves and are not suited for use where large amounts of compensation are required, as in large military and supersonic transports, due to the limited movement of these crossheads as well as to excessive variation in spring rig load with increasing magnitudes of compensation.

The principal object of the present invention is to provide a novel cable tension regulator that, while adapted to be built in compact form and of relatively small diameter and light in weight, nevertheless is capable of providing large amounts of compensation without objectionable changes in rig loading.

Another object of the present invention is to provide novel locking means for said regulator, comprising locking rotors having pinions connected therewith, which pinions mesh with gear teeth positioned on opposite sides of said pinions and movable with said regulator pulley sheaves so that, when a control force is applied to a control cable producing differential forces on said pinions, the locking rotors are tilted slightly, thereby locking the same in their supported structures so that a control movement is effected as desired.

A feature of the present invention is to provide a compensating spring means capable of providing a substantially constant rig load coupled to said locking rotors and hence to said pinions for applying rig load tension to said regulator pulley sheaves and to their connected cables.

Another object of the present invention is to provide a novel cable tension regulator that is capable of applying high rig loads when desired by the use of spiral power springs interposed between the sheave hubs, said hubs being of modular design, whereby sheaves of different radial sizes may be produced while using a standard pair of sheave hubs.

A feature of the invention is to provide a surge lock for locking said sheaves against relative turning in the event a control cable, for example, should break, or a compensating spring should break, thereby preventing hard over movement of a control surface due to the spring force of the regulator.

These and other features and advantages of the present invention will be more apparent after a perusal of the following specification taken in connection with the accompanying drawings wherein:

FIG. 1 is a view in side elevation, with parts broken away, of the novel cable tension regulator of this invention;

FIG. 2 is a sectional view taken along line 2—2 of FIG. 1;

FIG. 8 is an enlarged sectional view taken along line 8—8 of FIG. 7;

FIG. 9 is a fragmentary view showing a slight modification in the manner of attaching the sheaves to the sheave drums; and FIG. 10 is a fragmentary view illustrating devices for locking the regulator and hence for preventing hard over movement of the controlled member in the event of a sudden surge.

Similar characters of reference are used in the above figures to designate corresponding parts.

Figure 3:
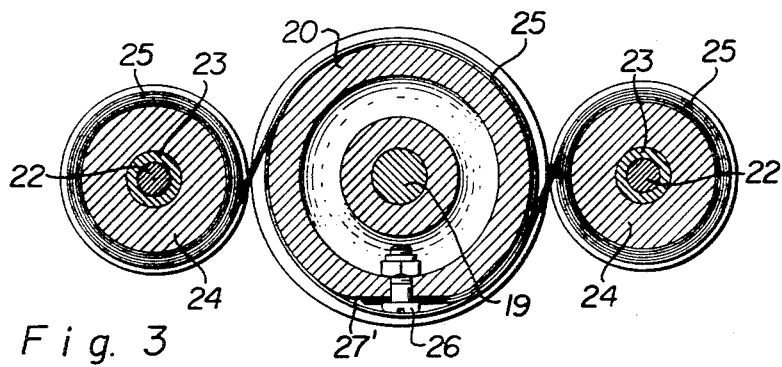
FIG. 3 is an enlarged sectional view taken along line 3—3 of FIG. 1.
Figure 4:
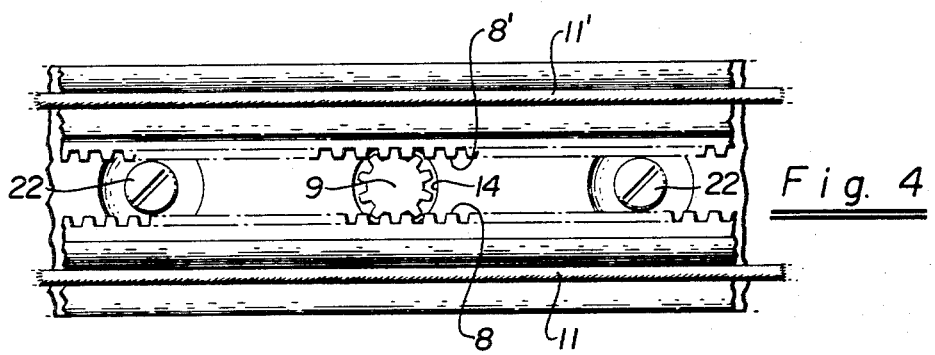
FIG. 4 is an enlarged fragmentary view taken along line 4—4 of FIG. 1.

Referring now to FIGS. 1 through 6 of the drawings, the reference numeral 1 designates a spoked main frame member of a shape similar to that of a flywheel and provided with a hub 2 splined upon a hollow drive shaft 3 that is illustrated as turnably supported in a bearing 4 carried by the aircraft, the shaft 3 having a control arm 5 splined thereon and connected for driving a controlled member (not shown) such as an aileron or rudder. The peripheral surface of the main frame member 1 is annularly grooved at spaced points for receiving balls 6 providing an anti-friction support for independently movable ring-like cable sheaves 7 and 7' which are internally grooved for receiving the balls 6.

The sheaves 7 and 7' are spaced apart somewhat and are provided on their opposed annular surfaces with gear teeth 8 and 8' for meshing with the conforming teeth of pinions 9, three such pinions spaced angularly 120° apart being employed in the drawings. The pinions 9 are preferably beveled pinions and mesh with beveled gear teeth 8 and 8' on the sheaves 7 and 7'. The balls 6 not only turnably support the sheaves 7 and 7' on the main frame 1 but also carry the thrust of the teeth of pinions 9, meshing with the gear teeth 8 and 8' in use. Since the sheaves 7 and 7' engage opposite sides of the pinions 9, as these pinions revolve the sheaves will turn in opposite directions on the frame 1 as is desired during compensation and as will further appear. Sheaves 7 and 7' have grooves 10 and 10' respectively for receiving control cables 11 and 11'. A hitch 12 serves to anchor cable 11 in a socket provided in sheave 7 while cable 11' is anchored by hitch 12' in a socket provided in sheave 7'.

The pinions 9 are formed integral or fixed on spindles 13 extending radially inwardly of the rim portion of frame 1 within apertures 14 provided in the frame 1. The inner portions of spindles 13 are provided with enlarged cylindrical hub portions or rotors 15 that fit freely within conforming recesses in bushings 16 that are fixed in frame 1, the inner sides of rotors 15 being supported on bearing rings 18 retained in position by expandable lock rings 17 fitting in annular grooves in the bushings 16. The inner end portions of spindles 13 are recessed at 28 for engaging the hexagonally flattened reduced outer ends of spool shafts 19 (see FIG. 2), thereby providing a drive coupling between the spindles 13 and shafts 19. Spools 20, as of nylon, are fixed on shafts 19 and these shafts are rotatably supported at their inner reduced ends upon plates 21 that are attached to the main frame 1 by bolts 22 and tubular spacers 23.

Negator type spiral springs 25 are mounted on spools 24, as of plastic such as nylon. Spools 24 are mounted on spacers 23 at opposite sides of the spools 20, and have their outer end portions attached to spools 20 as by bolts 26 mounted on flattened portions 27' of spools 20 (see FIGS. 2 and 3). Negator springs 25 tend to unwind from spools 20 and wind onto spools 24, thereby tending to turn the spool 20, for example, shown in FIG. 3, counter-clockwise, hence tending to turn the connected pinion 9, resulting in rotating sheaves 7 and 7' in opposite directions on frame 1 as during compensating movement until stop pin 27 is engaged and obstructed by a pinion 9, i.e., in the absence of rig tension on cables 11 and 11'; thus, this pin limits the overall sheave movement, thus retaining the regulator in a preloaded position. The negator springs 25 are adapted to apply a desired rig tension or load on the sheave cables 11 and 11' in use, and by their nature these springs supply a substantially constant rig load regardless of the extent of compensating movement of the sheaves 7 and 7', thus especially adapting the regulator of this invention for use on large aircraft and other craft such as vertical take-off and veriable wing-sweep types. While three pinions 9 and associated spools 20 and 24 are shown in the drawings, it will be apparent that a greater or lesser number of these sub-assemblies may be mounted in the frame 1 depending upon the requirements of any particular insallation.

Figure 6:
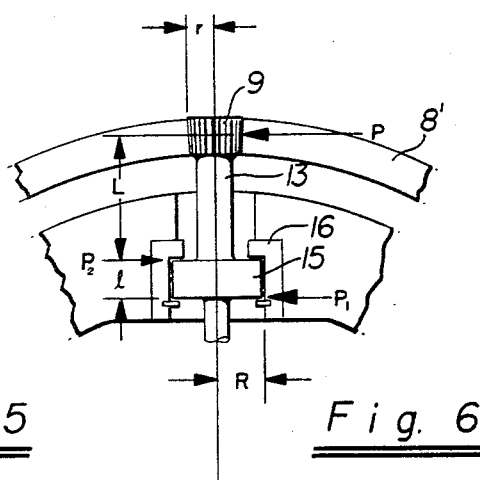
FIG. 6 is a fragmentary schematic view for illustrating the theory of operation of the regulator locking means.

To explain the locking operation of the regulator, when a control movement is applied to one of the cables 11 or 11', reference is made to FIG. 6 wherein, if P is the applied cable load (assuming for simplicity that the cable pitch diameter is the same as the gear pitch diameter) and $\mu$ is the coefficient of friction between the rotor 15 and bushing 16, then the following equations apply:

$$P(L) = P_1(l)$$
$$P(L+l) = P_2(l)$$

then $$P(2L+l) = (P_1+P_2)l$$

so that for a self-energizing locking action, $$Pr \leq P_1 \mu R + P_2 \mu R$$

or $$Pr \leq (P_1+P_2)\mu R$$

or $$P_1 + P_2 \geq Pr/\mu R$$

then $$P(2L+l) \geq (Pr/\mu R)l$$

or $$L/l \geq r/Z\mu R - \tfrac{1}{2}$$

In other words, once the pinion diameter and rotor diameter are chosen, then, for a given coefficient of friction, the geometrical dimensions L and l are given by the final equation, or with these lengths given the diameters of 9 and 15 can be solved by using the equation. It will be noted that the final equation is independent of the applied force P. Thus, no matter what the control load may be, the lock is self-energizing if a sufficiently conservative coefficient of friction is employed. As an example, if a pinion 9 having a diameter of 5/16-inch and a rotor 15 having a diameter of 5/8-inch are desired, and assuming a coefficient of friction of .08, it will be found that $L/l$ is $16/2 (.08) (.31) - \tfrac{1}{2} = 2.7$. That is, L, the length of spindle 13, must be at least 2.7 times l, the length of rotor 15, for self-energizing locking. Thus, l must be small in comparison with L to facilitate the tipping action of the control force upon the pinion 9, spindle 13, and rotor 15 to effect the desired braking of this rotor upon the bushing 16.

Hence, in use, the negator springs 25, acting through spools 20 and pinions 9, serve to apply the desired rig load to the sheaves 7 and 7', thereby maintaining cables 11 and 11' under desired tension. Expansion or contraction of the two cables simultaneously with respect to the airframe, due to airframe, flexure temperature changes, wing movement, etc., is permitted by pininons 9 winding or unwinding the negator springs upon spools 20. When a control force is applied to one of the cables, say, for example, to cable 11', then pinions such as pinion 9 at the top of FIG. 1 are tilted slightly, thereby tilting spindle 13 and rotor 15, causing this rotor to brake against the bushing 16 as explained above, causing sheaves 7 and 7' along with frame member 1 to turn together along with control arm 5, so that the desired control movement of the regulator takes place. When the control force is removed and the tensions in cables 11 and 11' are again equal, the pinions 9 are free to turn to permit compensating movement of the regulator.

Figure 5:
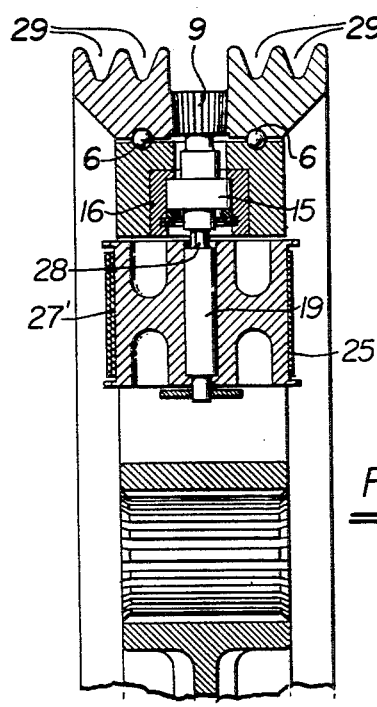
FIG. 5 is a fragmentary view showing the use of an extra cable groove for extra large compensation or rotation.

When extremely large compensating movements or cable travels are desired, the helical grooves 10 and 10' may be extended as shown at 29, 29' in FIG. 5.

Referring now to FIGS. 7 to 10, the reference numeral 31 designates the spoked frame member having its hub portion 32 splined on the hollow drive shaft 3 that is shown as turnably supported in the bearing 4 carried by the aircraft, the shaft 3 having a control arm 5 splined thereon and connected for driving a controlled member. The spokes 32' of frame member 31 are cupped at their outer ends for fixedly carrying bushings 16 within which rotors 15 fit freely and are retained therein by expandable lock rings 17 fitting in annular grooves in the bushings 16. Spindles 13 connect the rotors 15 to the pinions 9 that mesh with gears 33 and 33' that are respectively fixed upon the hollow sheave hubs 34, 34' carrying cable sheaves 35, 35'. Hubs 34, 34' have turned-in inner portions 55, 55' that turn on bearings provided on frame member hub 32. The radial outer portions of hubs 34, 34' are overlapped and are oppositely annularly recessed to accommodate a single row of balls 6 which take the thrust of pinions 9 on gears 33, 33' and retain sheave hubs 34, 34' in assembled relation through providing for free relative turning thereof.

A pair of flat spiral compensating springs 36, 36', which are adapted to provide a wide range of compensating rig loads merely by varying the thickness of the same, have their inner ends fastened as by rivets 37 to hub inner portions 55 and 55' respectively and their outer ends connected to lugs 38, 38' respectively formed on the inner walls of hubs 34, 34' for urging sheave hubs 34, 34' and sheaves 35, 35' to turn in opposite directions to maintain rig load in cables 11, 11'. In this way, each spring 36 and 36' is attached to both sheaves 35 and 35' so in case one spring should break, the regulator is still operative. It will be noted that spiral springs 36, 36' fit neatly within the hubs 34, 34' of sheaves 35, 35', and by their very nature provide large compensating movements of the regulator. These sprial springs enable increased torque to be exerted between sheaves 35, 35' without torque amplification such as required when using negator springs.

Figure 7:
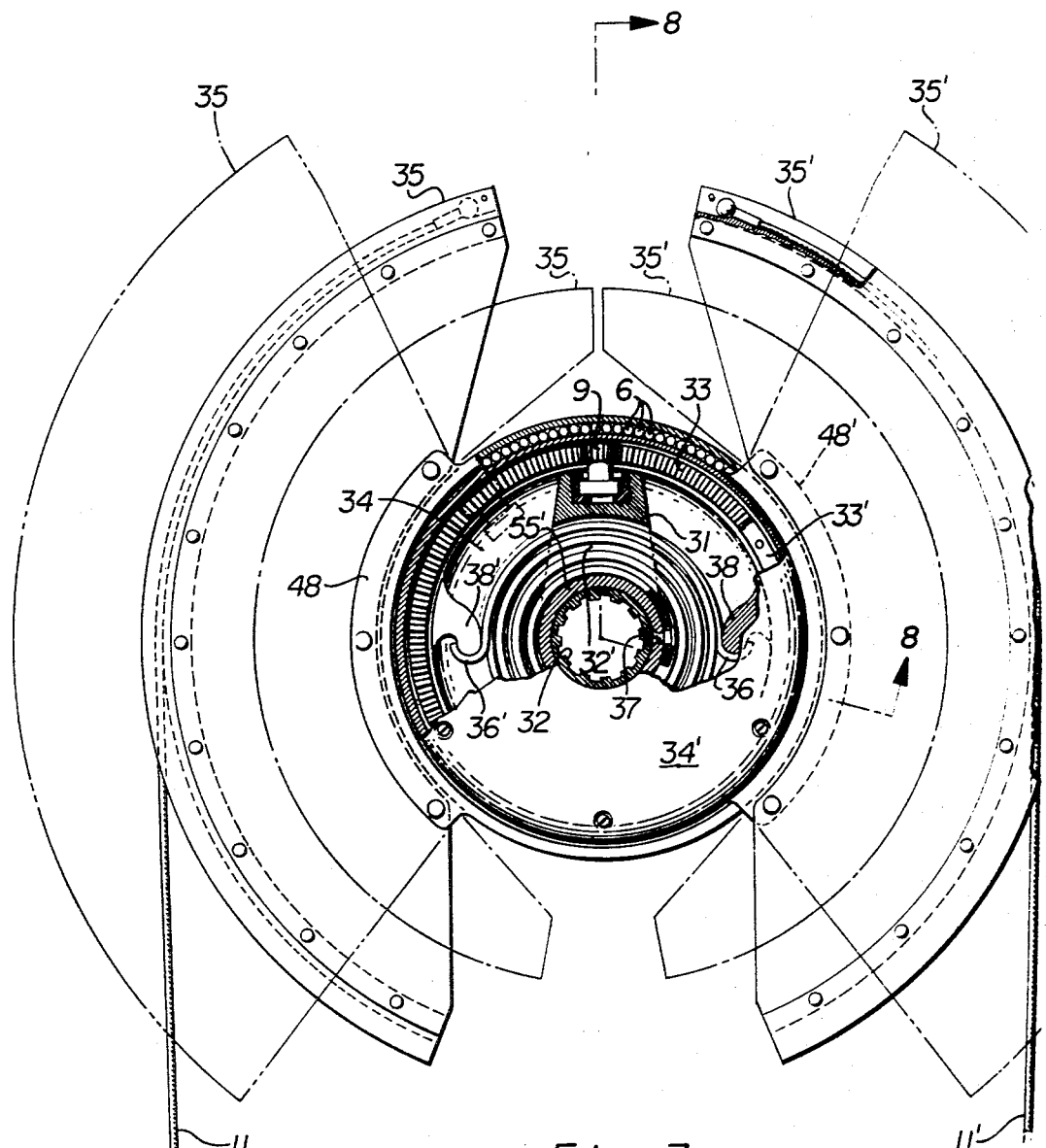
FIG. 7 is a view in side elevation, with parts broken away, of the cable tension regulator of this invention employing spiral power springs interposed between sheave hubs to effect the compensation action.

The sheave hubs 34, 34', springs 36, 36' and locking means 9–15 form a modular sub-assembly to which sheaves of different diameters may readily be attached as illustrated in dot-dash lines in FIG. 7 the hubs 34, 34' being flanged at 48, 48' to facilitate such attachment. The rig load can be changed by changing the specifications of springs 36, 36' without changing the dimensions of hubs 34, 34'.

FIG. 9 shows a slight modification wherein hubs 34, 34' are retained in assembled relation by ball races 51, 51' attached to flanges 50, 50' formed on hubs 34 and 34', the flanges 50, 50' being adapted to have sheaves 35 and 35' attached thereto.

In FIG. 10, an excessive acceleration or surge lock is illustrated incorporated with the regulator locking means 9–15. In this figure, the rotor 15 and a cooperating clutch disc 39 have opposed tapered recesses in which balls 44 ride. A light coil spring 46 pressing upwardly on disc 39 normally retains balls 44 in the deep portions of recesses 41, but, should a cable break or other sudden surge occur, the resulting high acceleration of rotor 15 will cause disc 39 to lag and balls 44 to ride up in their tapered recesses and lock the lower serrated face of disc 39 against frame member 31 through gripping of cooperating teeth 47, thereby also locking rotor 15 and preventing relative rotation of sheaves 35, 35' so that the controlled member 5 is prevented from turning hard over. Also in this figure, a surge lock of the type disclosed in U.S. patent application Ser. No. 460,286 filed June 1, 1965, now patent No. 3,316,775, in the names of Robert J. Wrighton and James E. Glauser as inventors, for "Control Line Regulator," may be employed. Pinion 9' meshing with sheave teeth 33 and 33' rotates shaft 40, disc 43 fixed thereon, and cooperating free disc 42, during normal compensating movements of the regulator. Balls 44 ride in inclined slots in discs 42 and 43 and are normally retained in the deep portions of these slots by light springs 46 acting between shaft 40 and disc 42; but, should a cable break, the resulting high acceleration of disc 43 will cause balls 44 to ride up into the shallow portions of their sockets and lock discs 42 and 43 against frame portion 45, thereby preventing hard over movements of the regulator.

What is claimed is:

1. A cable tension regulator comprising a frame member having a hub portion for driving a controlled member, a pair of regulator sheaves turnably carried by said frame member, said sheaves being provided with hitches for attaching control cables thereto, opposed gears connected to said sheaves, pinions interposed between said gears and meshing therewith, regulator spring means carried by said frame member for urging said sheaves in opposite directions to effect compensating movements of said regulator, rotary locking means connected to said pinions and turnable therewith, and co-operating bushings engaging said locking means and carried by said frame member and responsive to the application of a control force to one of the control cables, acting through said pinions and said locking means to lock said sheaves against relative turning to effect a control movement of said controlled member.

2. A cable tension regulator as defined in claim 1 wherein said frame member has a substantially cylindrical peripheral portion provided with bearings, said regulator sheaves being arranged in spaced apart relation and mounted on said bearings for turning with respect to said frame member, said opposed gears being fixed on said sheaves, said pinions being intermediate said sheaves and meshing with said gears, said spring means being connected to said pinions tending to turn the latter to cause opposite turning of said sheaves and effect compensating movements of said regulator allowing the regulator cables to expand and contract, said rotary locking means comprising rotors connected to said pinions for locking the latter and hence said sheaves against turning in the event a control force is applied to a control cable, thereby effecting the turning of said frame member and actuation of said controlled member, the application of a control force to a control cable causing slight tilting of said pinions and rotors, resulting in the braking of the latter upon said co-operating bushings, whereby relative movement of said sheaves is prevented and enabling the carrying out of the control movement to actuate the controlled member.

3. A cable tension regulator as defined in claim 2 wherein said spring means for turning said pinions comprises coil springs carried by said frame member, drums driven by said coil springs, and substantially radially extending spindles coupled at their inner end portions to said drums, the outer end portions of said spindles having said pinions fixed thereon.

4. A cable tension regulator as defined in claim 3 wherein said rotors are formed on said spindles and spaced from said pinions within said frame member, said bushings slidably engaging said rotors, the application of a control force to a control cable causing slight tilting of said pinions, spindles and rotors, resulting in the braking of the latter upon said bushings, whereby relative movement of said sheaves is prevented and enabling the carrying out of the control movement to actuate the controlled member.

5. A cable tension regulator as defined in claim 4 wherein one of said sheaves carries a stop pin for engaging a pinion to limit the relative movement of said sheaves, said frame member bearings comprising annular recesses in said frame member and in said sheaves, and balls within said recesses for carrying both the tension of the regulator cables and the thrust of said pinions against said sheave gears.

6. A cable tension regulator as defined in claim 2 comprising an additional pinion interposed between said sheave gears and meshing therewith, and surge locking means comprising a disc driven by said additional pinion, a cooperating disc opposed to said first disc, both discs being carried by said frame member and having tapered opposed slots, and balls within said slots, excessive acceleration of said additional pinion due as to the breaking of a cable causing said balls to ride up in their slots to lock said discs against movement, thereby preventing accidental hard over movement of the controlled member.

7. A cable tension regulator as defined in claim 1 wherein said regulator sheaves have hollow complementary sheave hubs, said hubs having outer overlapping portions provided with complementary ball grooves, and a single row of balls in said grooves for maintaining said hubs in assembled side-by-side relation, said spring means comprising a pair of spiral springs, each of said spiral springs having its ends respectively connected to said respective hubs for urging said sheave in opposite directions.

8. A cable tension regulator as defined in claim 7 wherein said locking means comprises bushings carried by said frame member, rotors turnable within said bushings, spindles extending from said rotors, pinions on said spindles removed from said bushings, and gears on said sheave hubs meshing with said pinions, the application of a control force to one of said sheaves serving to tilt said pinions, said spindles and said rotors to cause the latter to brake in said bushings to lock said sheaves against relative turning and effect the desired control operation.

References Cited

UNITED STATES PATENTS

| 2,371,130 | 3/1945 | Cushman | 74—501.5 |
| 2,581,080 | 1/1952 | Cushman | 74—501.5 |
| 3,180,176 | 4/1965 | De Maagd et al. | 74—501.5 |
| 3,316,775 | 5/1967 | Wrighton et al. | 74—501.5 |

MILTON KAUFMAN, Primary Examiner